United States Patent
Bonas (10) Patent No.: US 11,456,936 B2
(45) Date of Patent: *Sep. 27, 2022

(54) DETECTION AND CLEANUP OF UNUSED MICROSERVICES

(71) Applicant: Red Hat, Inc., Raleigh, NC (US)

(72) Inventor: Alissa Bonas, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,315

(22) Filed: Feb. 25, 2021

(65) Prior Publication Data

US 2021/0184951 A1 Jun. 17, 2021

Related U.S. Application Data

(63) Continuation of application No. 16/553,564, filed on Aug. 28, 2019, now Pat. No. 10,938,691.

(51) Int. Cl.
*H04L 43/08* (2022.01)
*H04L 41/22* (2022.01)
*H04L 67/56* (2022.01)

(52) U.S. Cl.
CPC .............. *H04L 43/08* (2013.01); *H04L 41/22* (2013.01); *H04L 67/56* (2022.05)

(58) Field of Classification Search
CPC .......... H04L 43/08; H04L 41/22; H04L 67/28
USPC ........................................................ 709/224
See application file for complete search history.

(56) References Cited

U.S. PATENT DOCUMENTS

| | | | |
|---|---|---|---|
| 7,944,926 B2 | 5/2011 | Zhang et al. | |
| 8,738,589 B2 | 5/2014 | Stark et al. | |
| 8,949,931 B2 | 2/2015 | Ermagan et al. | |
| 9,130,859 B1 * | 9/2015 | Knappe | H04L 45/16 |
| 9,356,793 B1 * | 5/2016 | Drobychev | H04L 67/01 |
| 9,544,331 B2 | 1/2017 | Wilson | |
| 10,178,045 B2 | 1/2019 | Kumar | |
| 10,585,746 B2 * | 3/2020 | Shilane | G06F 11/0721 |
| 10,599,498 B2 * | 3/2020 | Nakaike | G06F 9/547 |

(Continued)

FOREIGN PATENT DOCUMENTS

| | | |
|---|---|---|
| CN | 104932944 A | 9/2015 |
| WO | 2015027935 A1 | 3/2015 |
| WO | 2018197928 A1 | 11/2018 |

OTHER PUBLICATIONS

Miiller, Brian, "Zero Code Deployments by Valuing Configuration Over Code", https://bettercloud.tech/zero-code-Jeployments-by-valuing-configuration-over-code-ad56e0a344ea, May 22, 2018, 6 pages.

(Continued)

*Primary Examiner* — Tauqir Hussain
(74) *Attorney, Agent, or Firm* — Lowenstein Sandler LLP (57) ABSTRACT

Systems and methods for detection and cleanup of unused microservices. An example method comprises: identifying, by a processing device, a microservice in a running state; identifying a network proxy associated with the microservice; monitoring traffic between the network proxy and the network; determining that the network proxy has no traffic with the network during a window, wherein the window is a predetermined period of time or a predetermined amount of data that is sent to or from the network; and deleting the microservice and the network proxy.

20 Claims, 5 Drawing Sheets

(56) References Cited

U.S. PATENT DOCUMENTS

| | | | |
|---|---|---|---|
| 10,645,153 B2* | 5/2020 | Hassan | H04L 67/34 |
| 10,740,112 B2 | 8/2020 | Fichtenholtz et al. | |
| 10,938,691 B1* | 3/2021 | Bonas | H04L 67/28 |
| 11,153,190 B1* | 10/2021 | Mahajan | H04L 45/24 |
| 2005/0135248 A1* | 6/2005 | Ahuja | H04L 69/163 370/235 |
| 2011/0310902 A1* | 12/2011 | Xu | H04L 67/63 370/392 |
| 2013/0091264 A1 | 4/2013 | Shieh et al. | |
| 2013/0263245 A1 | 10/2013 | Sun et al. | |
| 2017/0063659 A1* | 3/2017 | Platon | H04L 41/065 |
| 2018/0032399 A1* | 2/2018 | Johnson | G06F 11/2033 |
| 2018/0069806 A1* | 3/2018 | Kumar | H04L 47/827 |
| 2018/0115523 A1* | 4/2018 | Subbarayan | H04L 63/0281 |
| 2018/0121221 A1* | 5/2018 | Ahuja | H04L 63/02 |
| 2018/0270203 A1* | 9/2018 | Zhao | H04L 63/029 |
| 2018/0287883 A1* | 10/2018 | Joshi | G06F 9/45558 |
| 2019/0098106 A1* | 3/2019 | Mungel | H04L 67/02 |
| 2019/0199738 A1* | 6/2019 | Jain | H04L 43/20 |
| 2019/0250835 A1* | 8/2019 | Piccinini | G06F 21/78 |
| 2020/0007455 A1* | 1/2020 | Chhabra | H04L 47/70 |
| 2020/0133795 A1* | 4/2020 | Rhodes | G06F 11/1464 |

OTHER PUBLICATIONS

Longbottom, Clive, "Overcome 9 Microservices Challenges for Platform Flexibility", https://searchcloudcomputing.echtarget.com/tip/Overcome-9-microservices-challenges-for-platform-flexibility, Jun. 24, 2019, 5 pages.

Viviani, Fernando, IBM, IBM Redbooks Microservices Best Practices, https://www.passeidireto.com/arquivo/63501356/-norm-IBM-redbooks-microservices-best-practices/37, 4 pages.

USPTO, Office Action for U.S. Appl. No. 16/553,564, dated Jun. 1, 2020.

USPTO, Notice of Allowance for U.S. Appl. No. 16/553,564, dated Oct. 28, 2020.

USPTO, Notice of Allowance for U.S. Appl. No. 16/553,564, dated Dec. 11, 2020.

* cited by examiner

DETECTION AND CLEANUP OF UNUSED MICROSERVICES

RELATED APPLICATIONS

This application is a continuation of U.S. patent application Ser. No. 16/553,564 filed on Aug. 28, 2019, the entire content of which is incorporated by reference herein.

TECHNICAL FIELD

The present disclosure is generally related to computer systems, and more particularly, to detection and cleanup of unused microservices.

BACKGROUND

Microservices are small, autonomous executable code services that work together to form an application. Microservices structure an application as a collection of loosely coupled services. The central idea behind microservices is that some types of applications become easier to build and maintain when they are broken down into smaller, composable pieces which work together. Each component may be continuously developed and separately maintained, and the application is then simply the sum of its constituent components. This is in contrast to a traditional, monolithic application which is all developed all in one piece.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for detection and cleanup of unused microservices.

Microservices work together in various ways. For example, if a user of an online retail application wants to buy something, they need to know if the item is in stock. So, the microservice that communicates with the company's inventory database needs to communicate with the product webpage microservice, which itself needs to communicate with the user's online shopping cart microservice. To add business value, this retailer might eventually build a microservice that gives users in-application product recommendations. This new microservice will communicate with a database microservice of product tags to make recommendations, but it also needs to communicate with the same inventory database microservice that the product page needed. Modern applications may be broken down in this way, as a network of microservices each performing a specific business function.

Throughout the development cycle of an application, a developer employs several microservices that work together to form an application. Different replicas (also known as "instances") of each microservice are frequently created for various reasons, including testing, experimentation, and scaling availability purposes. As development of the application continues, certain microservices and their replicas become obsolete for the implementation of the application. However with many microservices and tasks involved in the development process, it is easy for the developer to lose track of the microservices that have become obsolete. The presence obsolete microservices may adversely affect the code base management and/or cause various coding errors (e.g., calling an obsolete microservice when a newer implementation exists).

The present disclosure addresses the above-noted and other deficiencies by providing methods and systems for detecting and removing these unused microservices, thus facilitating the code base maintenance. In accordance with one or more aspects of the present disclosure, obsolete microservices may be identified based on the lack of detected network traffic to and/or from such microservices or their sidecar proxies. The detected obsolete microservices, together with all their sidecar proxies and replicas, may be deleted, as described in more detail herein below.

Figure 1:
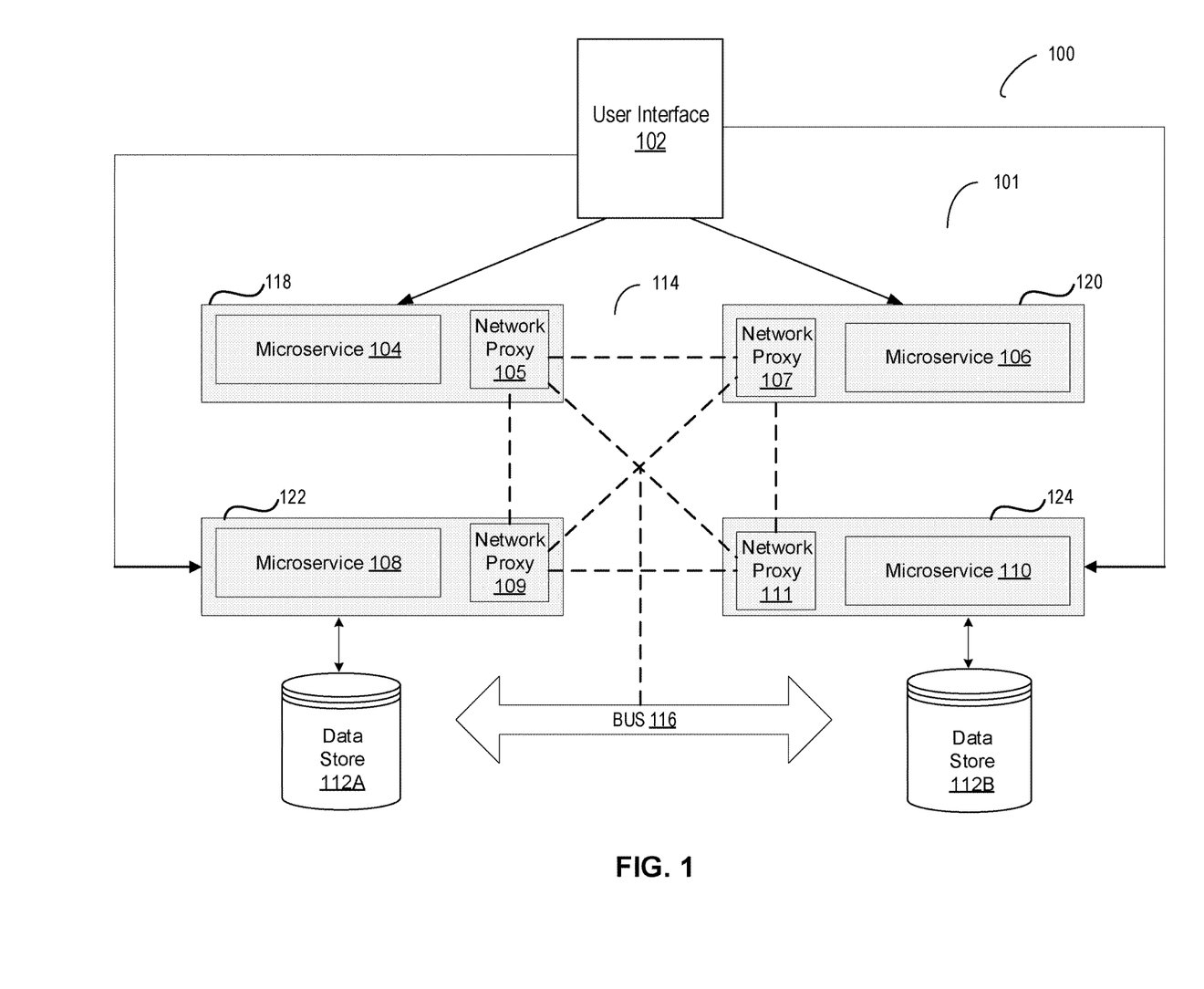
FIG. 1 depicts a system diagram of an example microservice computer system architecture 100, in accordance with one or more aspects of the present disclosure.

FIG. 1 depicts a high-level component diagram of an illustrative example of a microservices architecture 100, in accordance with one or more aspects of the present disclosure. One skilled in the art will appreciate that other architectures for microservices architecture 100 are possible, and that the implementation of a computer system utilizing examples of the invention are not necessarily limited to the specific architecture depicted by FIG. 1.

As shown in FIG. 1, microservices architecture 100 may comprise one or more microservices 104, 106, 108, 110. Each of microservices 104, 106, 108, 110 may implement a function to be consumed by one or more applications 101. In some examples, each microservice 104, 106, 108, 110 has its own, individual data store that is not shared with any other microservice.

As an architectural framework, microservices 104, 106, 108, 110 are distributed and loosely coupled, so that a change to one microservice does not break the entire application 101 relying on the microservices 104, 106, 108, 110. The service-oriented architecture 100 allows services to be built, tested, and modified simultaneously. One of the benefits of using microservices is that development teams are able to rapidly build new components of applications to meet changing business needs. One of the benefits of the microservices architecture 100 in comparison to more traditional, monolithic approaches is how the microservices architecture 100 breaks an application down into its core functions. Each microservice may be built and deployed independently, meaning individual services can function (and fail) without negatively affecting the others.

Microservices architecture 100 allows for communication between microservices in a way that prepares for failures, future scalability, and new feature integration. The present service-oriented architecture 100 structures applications into discrete, reusable services that may communicate through an enterprise service bus (ESB) 116. In this architecture, individual microservices 104, 106, 108, 110 may communicate with each other through the ESB 116 using a communication protocol (e.g., SOAP, ActiveMQ, or Apache Thrift). Microservices 104, 106, 108, 110 may be utilized, together or individually, by application 101. ESB 116, the individual microservices 104, 106, 108, 110 and/or network proxies (also known as "sidecars") 105, 107, 109, 111 may store any data sent or requested to and from the individual microservices in data stores 112 A, 112 B. Network proxies implement executable code that run alongside their accompanying microservices to facilitate inter-microservice communications and application-microservice communication. Network proxies may send and receive requests to and from other microservices, network 204, data stores 112 A, B, user interface 102, ESB 116, resource allocation manager 202, and/or metrics store 208. A network proxy may perform address translation, protocol translation, and/or other operations with respect to the requests being processed.

User interface 102 may be used to display output and/or input of the microservices 104, 106, 108, 110 to a user. User interface 102 may include a physical computer monitor, command-line, menu driven interface and/or graphical user interface.

Microservices 104, 106, 108, 110 may communicate with each other, sometimes statelessly, so that apps can be more fault tolerant, less reliant on a single ESB 116. This also allows development (dev) teams to choose their own tools, since microservices 104, 106, 108, 110 may communicate through language-agnostic application programming interfaces (APIs). Microservices 104, 106, 108, 110 may be made more viable by implementing containerization technology.

Containers 118, 120, 122, 124 are a type of software that can virtually package and isolate microservices for deployment. With containers, developers are able to run multiple parts of an application independently, on the same hardware, with much greater control over their individual pieces and life cycles.

Each container may operate independently of others. Each microservice 104, 106, 108, 110 may communicate with others through APIs, with the containers being able to scale up microservices 104, 106, 108, 110 to meet rising demand for an application component and distribute the load. This setup encourages flexibility.

Containers may run inside of virtual machines, which means a host machine could have multiple OSes supporting multiple containers all sharing the same physical resources. Containers create an isolated execution environment for each of microservice 104, 106, 108, 110 code to consume host resources without acknowledging or depending upon the existence of other microservices 104, 106, 108, 110 using the same OS.

The microservices architecture 100 supports more agile deployment and updates, highly scalability (as demand for certain services grows, developers can deploy across multiple servers, and infrastructures), resiliency (independent services, when constructed properly, do not have to impact one another; easy deployment (because microservice-based apps are more modular and smaller than traditional, monolithic apps, the worries that came with monolithic application deployments are negated; microservice coordination may be implemented using a service mesh layer), accessibility (because a larger application is broken down into smaller pieces/services, developers may more easily understand, update, and enhance those pieces, resulting in faster development cycles, especially when combined with agile development methodologies), more freedom (due to the use of polyglot APIs, developers have the freedom to choose the best language and technology for the necessary function).

The microservices architecture 100 may be implemented using the following techniques.

Figure 2:
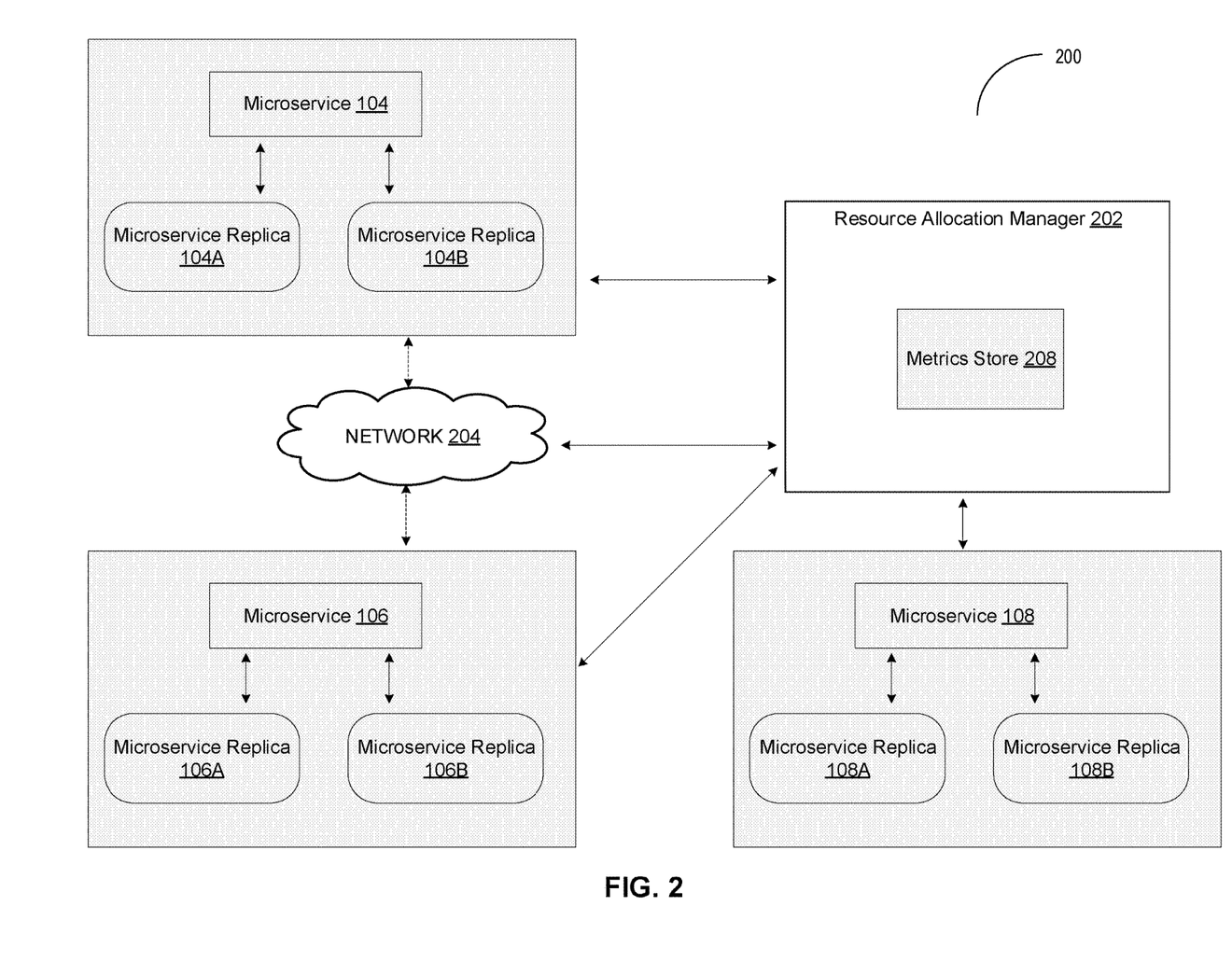
FIG. 2 depicts a block diagram of an unused microservice detection and cleanup system, in accordance with one or more aspects of the present disclosure.

Dependency Detection: Identifying dependencies between services 104, 106, 108, 110. Due to dependencies, completing one build may trigger several other builds. For example, as disclosed above, a product recommendation microservice may be dependent on the inventory database in selecting which products to recommend. Dependencies may be identified by the resource allocation manager 202 based on whether a given microservice sends or receives data from another microservice.

Versioning: When developers update to new versions, care may be taken to maintain backward compatibility. Developers may build in conditional logic to handle this. Alternatively, developers could stand up multiple live replicas for different clients.

Deployment: Automation of the deployment, testing, and detection and cleanup of unused microservices may be implemented to lower the complexity of deploying multiple microservices 104, 106, 108, 110.

Logging: With this distributed system, a developer may use centralized logs (e.g. a metrics store, and/or resource allocation manager) to manage all the microservices 104, 106, 108, 110. The developer may receive alerts (e.g., "Microservice 108 was unused during the past detection frame") and suggested courses of action via centralized logs (e.g., "Microservice 108 was unused during the past detection frame. Do you approve deletion of microservice 108? YES or NO?"). Developers may also take the suggested or other courses of action based on the data in the centralized logs and/or the promptings from the centralized logs.

Monitoring: A developer may have a centralized view of the system to pinpoint sources of problems.

Service mesh 114 is an infrastructure layer that controls microservice to microservice communication via the network proxies. Service mesh 114 provides a way to control how different parts of the application 101 (e.g., microservices 104, 106, 108, 110) share data with one another. This visible infrastructure layer may document how well different parts of an application interact, so it becomes easier to optimize communication and avoid downtime as an application grows.

In order to execute its function, one service 104 might need to request data from several other services 106, 108. 110. The service mesh 114 helps to prevent one service from being overloaded with requests—service mesh 114 routes requests from one service to the next, optimizing how all the moving parts work together.

In service mesh 114, requests may be routed between microservices 104, 106, 108, 110 through network proxies 105, 107, 109, 111, respectively. Network proxies 105, 107, 109, 111 run alongside each service 104, 106, 108, 110, respectively, rather than within them. In some embodiments, one proxy may manage the communication for more than one microservice. Taken together, these network proxies—decoupled from each service—may form a mesh network 114. The network proxies may route traffic to and from their accompanying microservice.

Every new service added to an app, or new instance of an existing service running in a container, introduces new points of possible failure. Service mesh 114 allows for problems and bugs to be located within the complex microservices architecture 100. Service mesh 114 also captures every aspect of microservice-to-microservice communication as performance metrics. For example, if a given service fails, service mesh 114 may collect data on how long it took before a retry succeeded. As data on failure times for a given microservice aggregates, rules may be written by the resource allocation manager 202 to determine the optimal wait time before retrying that microservice, ensuring that the system 100 does not become overburdened by unnecessary retries. The rules may be written in a policy and telemetry hub to control communication between network proxies.

The service mesh 114 may be logically split into a data plane and a control plane:

The data plane may include network proxies 105, 107, 109, 111. Network proxies 105, 107, 109, 111 may intercept and control all inbound and outbound network communication between microservices 104, 106, 108, 110 in the service mesh 114. Network proxies 105, 107, 109, 111 may also communicate with the policy and telemetry hub, a metrics store, and/or a resource allocation manager.

The control plane may be responsible for managing and configuring network proxies to route traffic, and configuring the resource allocation manager 202 to enforce policies and collect telemetry.

The resource allocation manager 202 may be the control plane component responsible for enforcing access control and usage policies (such as authorization, rate limits, quotas, authentication, request tracing, cleanup commands issued by the resource allocation manager or developer/administrator) and collecting telemetry data from the network proxies and other services.

FIG. 2 depicts a block diagram of a system implementing unused microservice detection and cleanup in accordance with one or more aspects of the present disclosure. Each microservice 104, 106, 108 may have replicas 104 A, 104 B, 106 A, 106 B, and 108 A, and 108 B, respectively. Replicas may be created by developers for testing, experimentation, parallel development of microservices, etc. Microservices 104, 106, 108 may be configured to communicate using their respective proxies 105, 107, 109 (see FIG. 1).

In FIG. 2, the network proxies associated with microservice 104 and/or replicas 104 A, 104 B may send and receive requests via network 204. Network 204 may include the service mesh 114. These network requests may include requests and responses for data from another microservice or requests and responses to or from the telemetry hub for access to a given network proxy. Microservice 106 and replicas 106 A, 106 B may also send and receive requests via network 204. Network requests may also pass through the resource allocation manager 202, which detects that a request has been made and logs each request in the metrics store 208. The resource allocation manager 202 may enforce access control and usage policies (such as authorization, rate limits, quotas, authentication, request tracing) and collect telemetry data from the network proxies and other services. The metrics store 208 may store logged and timestamped performance metrics of the microservices. Performance metrics may include data requests, request tracing, upload/download timing, etc.

In FIG. 2, resource allocation manager 202 includes a list of services that are running, which states that microservices 104, 106, and 108 are running. A microservice or replica may be deemed running by the resource allocation manager 202 if the microservice or replica is consuming system resources including access point services and router services, and/or if the microservice or replica's container instance is in the running state. An access point service may comprise a software and/or hardware component that sends and receives messages or requests, and/or allows microservices or replicas to connect to a wireless local area network. A router service may comprise a software and/or hardware component that receives, analyzes, and/or forwards data packets/requests/responses to a microservice and/or replica within the microservice architecture 100 and/or without the microservice architecture 100 (e.g. the internet, another service mesh, and/or another microservice architecture). Thus, resource allocation manager 202 verifies if the microservices 104, 106 are being used. In this example, resource allocation manager 202 determines that microservices 104, 106, and 108 are running while microservice 110 (see FIG. 1) is down for maintenance. Resource allocation manager 202 then tests to see if microservices 104, 106, and 108 have any network traffic. Resource allocation manager 202 detects that there are no network requests coming to and/or from the network proxies associated with microservice 108 or replicas 108 A, B, e.g., because no network requests have been logged by the metrics store 208. Alternatively, the presence or absence of network traffic to and/or from the network proxies associated with microservice 108 may be ascertained by inspecting the logs maintained by one or more network routers servicing the network 204 and/or by sniffing the traffic traversing the network 204.

The resource allocation manager 202 may set a detection window within which to verify if a microservice is being unused. If there is no network traffic to or from the microservice during the detection window, the resource allocation manager 202 determines that microservice 108 is being unused. The detection window may be represented by a pre-defined or dynamically configurable timeframe, data frame, or amount of network traffic (e.g., the number of requests traversing the network) within which at least one network request has to be sent or received by a microservice or else the microservice will be deemed unused. The detection window may be represented by a timeframe (e.g., a predetermined or dynamically configurable sliding window) based on a set time (e.g., past 7 days or 3 days ago—past time period, the next 12 hours or on Dec. 25, 2039—a future time period/date, from two hours ago to 3 hours from now—a mixture of past and present time, on Dec. 25, 2018 and December 2019—one or more selected dates, etc.). The timeframe may also be configured as a recurring schedule (e.g., once a day between 3:00 pm-9:00 pm EST, once a week on Mondays). The data frame may be a certain amount of data that is processed by the network 204 and/or metrics store 208 (e.g., for every 50 GB processed by the network 204 or stored in the metrics store 208, the resource allocation manager 202 checks if every service in the "service running" list has had some form of traffic via the network). The resource allocation manager 202 may use a combination of timeframes, data frames, and amount of requests logged by the metrics store to detect unused microservices (e.g. the window may be the first 50 GB of processed data or the first 24 hours or 200 requests, whichever comes first). In this case, resource allocation manager 202 detects that microservice 108 and its replicas 108 A, B have had no traffic (e.g., no request metrics in the metrics store) during a given detection frame/period. Accordingly, resource allocation manager 202 may delete microservice 108, replicas 108 A, and replica 108 B. Deletion of a microservice or replica may include deleting the running process, container image, access points, and/or router services. Deletion may also include deleting just one or more replicas or just the microservice. Deletion may be performed after verifying that a microservice and all its accompanying replicas have no traffic (e.g., aggregating a "no traffic" status between a microservice and its accompanying replicas). A deleted container image for the microservice may be reloaded from one of the container registries (e.g., docker hub, quay, organization-internal registry) if it is later desired. Deletion of microservice 108 and its replicas 108 A, B may be performed automatically by the resource allocation manager 202 or after an administrator approves of the deletion in response to a prompt by the resource allocation manager 202. The administrator may be asked to confirm deletion microservice 108 and its replicas 108 A, B via an email message, text message, GUI interface pop-up, sound, or and/or other notification.

Figure 3:
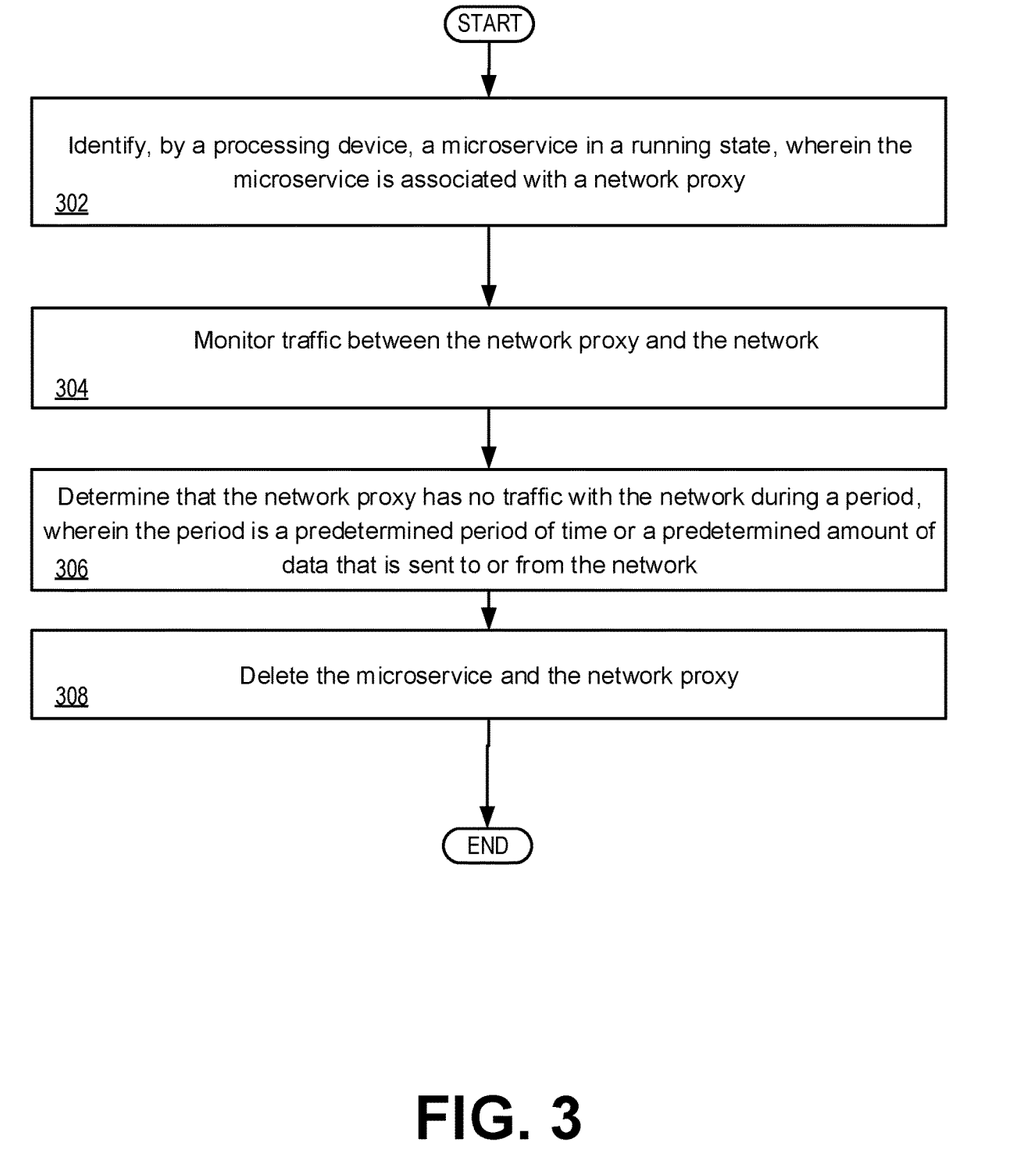
FIG. 3 depicts a flow chart for detection and cleanup of unused microservices, in accordance with one or more aspects of the present disclosure.

FIG. 3 depicts a flow chart for detection and deletion of unused microservices. At block 302, the resource allocation manager 202 identifies, by a processing device, a microservice in a running state, wherein the microservice is associated with a network proxy. A microservice may be deemed running if it is consuming system resources including access point services and router services, the container image is live, and/or the microservice is not down for repairs or maintenance.

At block 304, the resource allocation manager 202 monitors traffic between the network proxies and the network 204. Network traffic may include network requests that may pass through the resource allocation manager 202, which logs the detected requests in the metrics store 208. The resource allocation manager 202 may enforce access control and usage policies (such as authorization, rate limits, quotas, authentication, request tracing) and collect telemetry data from the network proxies and other services. The metrics store 208 may store performance metrics of the microservices. Performance metrics may include data requests, request tracing, upload/download timing, etc.

At block 306, the resource allocation manager 202 determines that the microservice has no traffic via the network. Resource allocation manager 202 may test to see if microservices 104, 106, and 108 have any network traffic. Resource allocation manager 202 detects that there are no network requests sent from the network proxies associated with microservice 108 or replicas 108 A, B, at least in part, because no network requests have been detected and/or logged in the metrics store 208. In some examples, a microservice can be deemed to have no traffic if it does not receive any requests via the network 204. The detection window/frame for determining there is no traffic may be a timeframe (e.g., a predetermined sliding window or a customizable window set by an administrator) based on a set time (e.g., past 7 days or 3 days ago—past time period, the next 12 hours or on Dec. 25, 2039—a future time period/date, from two hours ago to 3 hours from now—a mixture of past and present time, on Dec. 25, 2018 and December 2019—one or more selected dates, etc.). The timeframe may also be configured as a recurring schedule (e.g., once a day between 3:00 pm-9:00 pm EST, once a week on Mondays). The detection frame may be a data frame, a certain amount of data that is processed by the network 204 and/or stored in the metrics store 208 (e.g., for every 50 GB processed by the network 204 or stored in the metrics store 208, the resource allocation manager 202 checks if every service in the "service running" list has had some form of traffic via the network). The resource allocation manager 202 may use a combination of timeframes and data frames to detect unused microservices.

At block 308, the resource allocation manager 202 deletes the microservice. Deletion of a microservice/replica may include deleting any combination of its network proxy, instance, container image, access point services, and/or router services. One or more access point services and router services may be allocated, by an administrator or automatically upon creation of the microservice/replica, to each microservice/replica in order to facilitate communication between the microservice/replica and other components within and/or without the microservice architecture 100. Deletion may also include deleting one or more replicas or just the microservice. A deleted container image may be reloaded from one of the container registries (e.g., docker hub, quay, organization-internal registry) if it is later desired to be reintegrated into the service mesh 114. Deletion of microservice 108 and its replicas 108 A, B may be performed automatically by the resource allocation manager 202 or after an administrator approves of the deletion after he/she is prompted by the resource allocation manager 202. The resource allocation manager 202 may send a request to the administrator, via an alert, an email message, text message, GUI interface pop-up, sound, and/or another notification, to delete microservice 108 and its replicas 108 A, B.

If the administrator does not approve a deletion request from the resource allocation manager 202 within a given time of receipt or dispatch, or after a certain amount of data has been processed by the resource allocation manager 202 from the time the resource allocation manager 202 sends the deletion request to the administrator, or if the microservice system is reaching a bandwidth, data storage, or data transmission or reception speed limit, the resource allocation manager 202 may be programmed to automatically delete the microservice/replica. Resource allocation manager 202 may confirm deletion of microservices/replicas in a deletion log and/or via an alert, an email message, text message, GUI interface pop-up, sound, and/or another notification sent to the administrator.

As disclosed above, each microservice may be associated with one or more replicas, wherein each of the one or more replicas has an associated network proxy. A replica may be a copy, duplicate, or variation of a microservice. A microservice may be identified by the resource allocation manager as being in a running state because the resource allocation manager checks a list of running microservices and find the microservice on the list. The resource allocation manager 202 may delete a microservice, its associated replicas, and/or the network proxies associated with the microservice and its associated replicas after determining that each network proxy associated with the microservice and the one or more replicas has no traffic with the network. In some examples, the resource allocation manager 202 may only delete each network proxy associated with the microservice and its one or more replicas after determining that each network proxy associated with the microservice and its one or more replicas has no traffic with the network (e.g., the aggregate of the network proxy associated with the microservice and each network proxy associated with the one or more replicas has no traffic). The resource allocation manager 202 may only proceed to deletion if a microservice and its replicas, combined, have no traffic to and/or from their respective network proxies. In response to the resource allocation manager 202 determining that there is no traffic to the microservice and the one or more replicas, the resource allocation manager 202 may delete all access point services and all router services to the microservice and the one or more replicas. The deletion operation may be performed automatically by a resource allocation manager or upon receiving an approval of an administrator.

Figure 4:
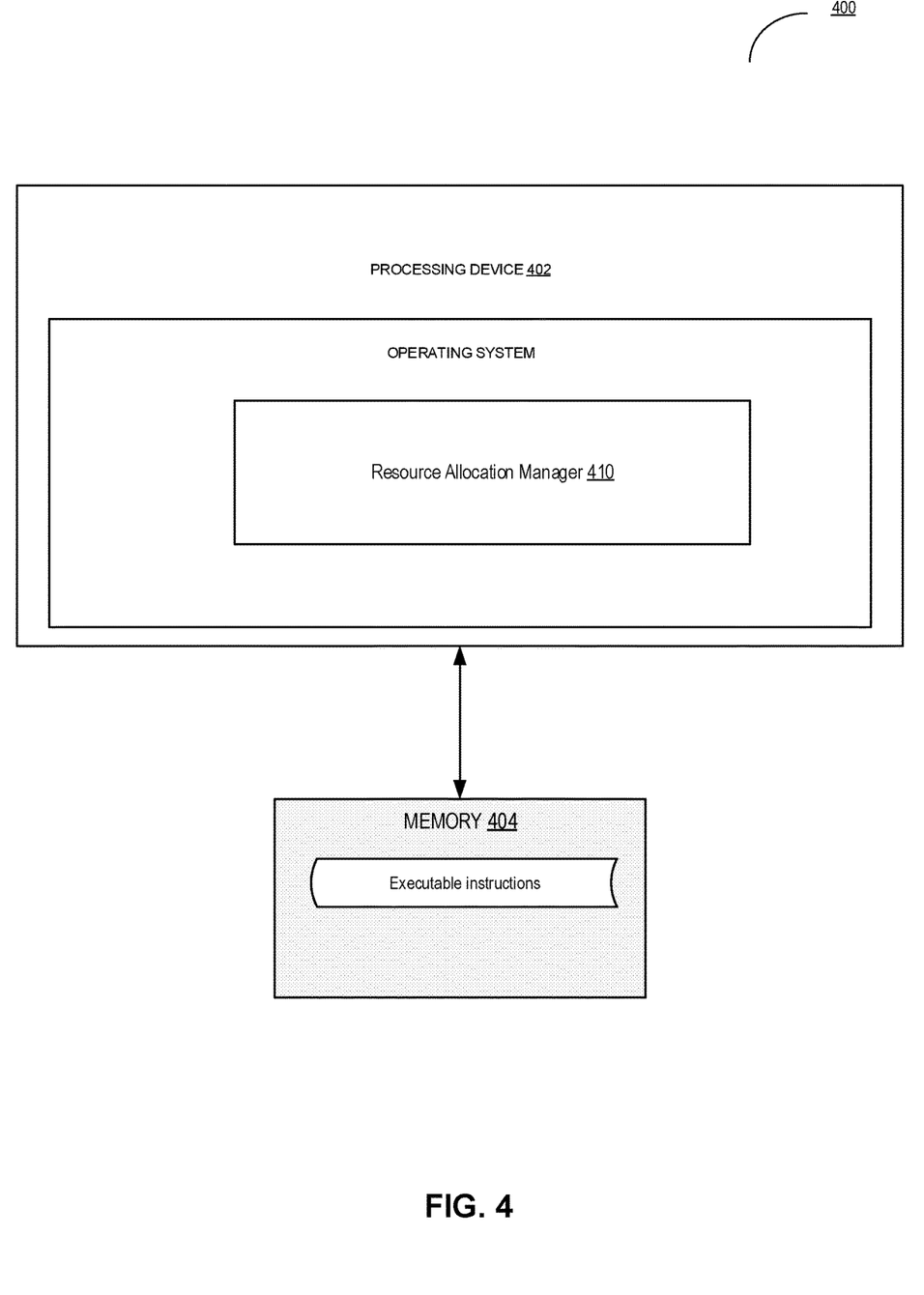
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be implement the example microservice architecture 100 and may include one or more processing devices 402 and one or more memory devices 404. In the example shown, computer system 400 may implement a resource allocation manager 410, the executable instructions of which may be stored in the memory 404.

The resource allocation manager 400 may enable the processing device to monitor network traffic to/from a specified microservice and/or a sidecar proxy of the specified microservice. Responsive to failing to detect any network traffic within a predetermined or dynamically configurable period of time or within a predetermined or dynamically configurable amount of captured network data, the processing device may delete the microservice, as described in more detail herein above.

Figure 5:
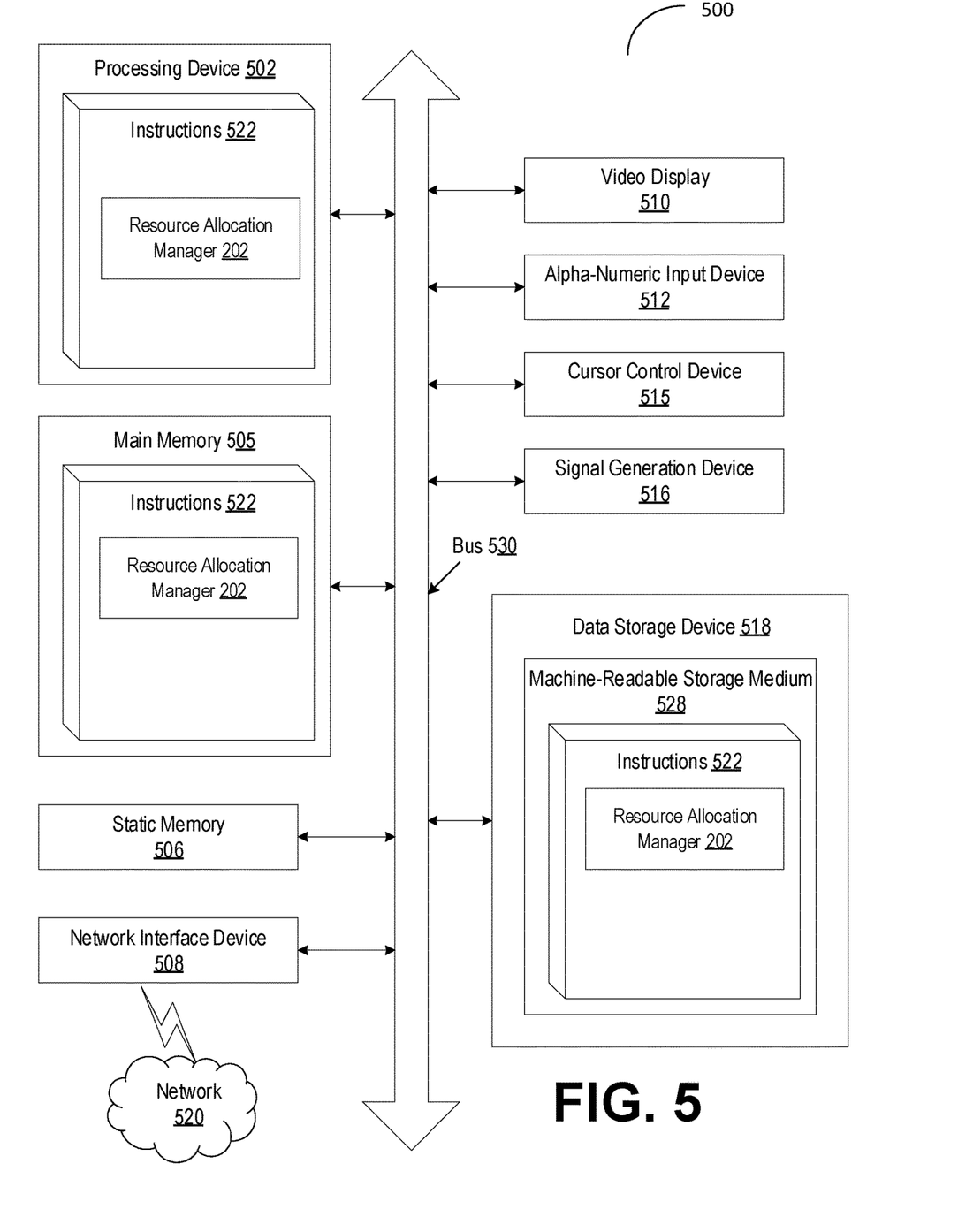
FIG. 5 depicts a block diagram of an illustrative computer system operating in accordance with one or more aspects of the present disclosure.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 505 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530. The processing device 502 may be operatively coupled with the main memory 505, static memory 506, and/or the data storage device 518.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 515 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 505 and/or within the processing device 502 during execution thereof by the computer system 500, the main memory 505 and the processing device 502 also constituting machine-readable storage media.

In one implementation, the instructions 522 include instructions for an unused microservice detection and cleanup controller (e.g., resource allocation manager 202 of FIG. 2) and/or a software library containing methods that call a snapshot interface. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "receiving," "executing," "returning," "loading," "associating," "granting," "sending," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   identifying, by a processing device, a microservice in a running state;
   identifying a network proxy associated with the microservice;
   monitoring network traffic associated with the network proxy;
   determining that the network proxy has no traffic within a detection window; and
   deleting the microservice, the network proxy, and a container image associated with the microservice.

2. The method of claim 1, wherein the detection window is a predetermined time window.

3. The method of claim 1, wherein the detection window is a predetermined number of requests.

4. The method of claim 1, wherein the network proxy performs one of:
   address translation or protocol translation.

5. The method of claim 1, wherein the network proxy routes requests associated with the microservice.

6. The method of claim 1, wherein identifying the microservice in the running state further comprises:
   determining that the microservice is on a list of running microservices.

7. The method of claim 1, further comprising:
   deleting an access point associated with the microservice.

8. The method of claim 1, further comprising:
   deleting a router service associated with the microservice.

9. A system comprising:
   a memory;
   a processing device operatively coupled to the memory, the processing device to:
   identify a microservice in a running state;
   identify a network proxy associated with the microservice;
   monitor network traffic associated with the network proxy;
   determine that the network proxy has no traffic within a detection window; and
   delete the microservice, the network proxy, and a container image associated with the microservice.

10. The system of claim 9, wherein the detection window is a predetermined time window.

11. The system of claim 9, wherein the detection window is a predetermined number of requests.

12. The system of claim 9, wherein the network proxy performs one of:
    address translation or protocol translation.

13. The system of claim 9, wherein the network proxy routes requests associated with the microservice.

14. The system of claim 9, wherein identifying the microservice in the running state further comprises:
    determining that the microservice is on a list of running microservices.

15. The system of claim 9, wherein the processing device is further to:
 delete an access point associated with the microservice.

16. The system of claim 9, wherein the processing device is further to:
 delete a router service associated with the microservice.

17. A non-transitory computer-readable storage medium comprising executable instructions that, when executed by a processing device, cause the processing device to:
 identify a microservice in a running state;
 identify a network proxy associated with the microservice;
 monitor network traffic associated with the network proxy;
 determine that the network proxy has no traffic within a detection window; and
 delete the microservice, the network proxy, and a container image associated with the microservice.

18. The non-transitory computer-readable storage medium of claim 17, wherein the detection window is provided by at least one of: a predetermined time window or a predetermined number of requests.

19. The non-transitory computer-readable storage medium of claim 17, wherein identifying the microservice in the running state further comprises:
 determining that the microservice is on a list of running microservices.

20. The non-transitory computer-readable storage medium of claim 17, further comprising executable instructions that, when executed by the processing device, cause the processing device to:
 delete at least one of: an access point associated with the microservice or a router service associated with the microservice.

* * * * *